United States Patent
Asahina et al.

(10) Patent No.: US 10,605,524 B2
(45) Date of Patent: *Mar. 31, 2020

(54) METHOD AND DEVICE FOR DRYING INSTANT NOODLES

(71) Applicant: NISSIN FOODS HOLDINGS CO., LTD., Osaka (JP)

(72) Inventors: Takeshi Asahina, Tokyo (JP); Takaaki Hibi, Tokyo (JP); Noriyuki Machida, Tokyo (JP); Mitsuru Tanaka, Tokyo (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 374 days.

This patent is subject to a terminal disclaimer.

(21) Appl. No.: 14/378,757

(22) PCT Filed: Mar. 18, 2013

(86) PCT No.: PCT/JP2013/001822
§ 371 (c)(1),
(2) Date: Aug. 14, 2014

(87) PCT Pub. No.: WO2013/145625
PCT Pub. Date: Oct. 3, 2013

(65) Prior Publication Data
US 2015/0037478 A1   Feb. 5, 2015

(30) Foreign Application Priority Data

Mar. 30, 2012 (JP) ................................. 2012-081357

(51) Int. Cl.
| | | |
|---|---|---|
| *A23L 3/40* | (2006.01) | |
| *A23L 7/113* | (2016.01) | |
| *F26B 3/06* | (2006.01) | |
| *F26B 3/08* | (2006.01) | |
| *F26B 9/06* | (2006.01) | |

(52) U.S. Cl.
CPC .................... *F26B 3/06* (2013.01); *A23L 3/40* (2013.01); *A23L 7/113* (2016.08); *F26B 3/08* (2013.01); *F26B 3/082* (2013.01); *F26B 9/06* (2013.01); *F26B 9/066* (2013.01); *F26B 2210/06* (2013.01); *F26B 2210/08* (2013.01)

(58) Field of Classification Search
USPC .................................................. 426/557, 451
See application file for complete search history.

(56) References Cited

FOREIGN PATENT DOCUMENTS

| EP | 0501159 A1 | | 9/1992 |
|---|---|---|---|
| EP | 2356913 | | 8/2011 |
| JP | 401191633 | * | 8/1989 |
| JP | H 03-251148 A | | 11/1991 |
| JP | H 07-053508 Y | | 12/1995 |
| JP | 2515849 Y | | 8/1996 |
| JP | H09-47224 A | | 2/1997 |
| JP | H 09-051773 A | | 2/1997 |
| JP | H-0947224 | | 2/1997 |
| JP | 2666224 B | | 6/1997 |
| JP | H-09210554 | | 8/1997 |
| JP | H10-155444 | | 6/1998 |
| JP | 2898580 B2 | | 6/1999 |
| JP | 2003-090680 | | 3/2003 |
| JP | 2003-153661 A | | 5/2003 |
| JP | 2005-160401 A | | 6/2005 |
| JP | 4772160 B1 | | 9/2011 |
| JP | 2012-060999 A | | 3/2012 |

OTHER PUBLICATIONS

Russian Office Action in related Russian Application No. 2014143761/13(070661), dated Nov. 11, 2015 (with English-language translation).
Extended European Search Report in related European Application No. 13768532.7, dated Jan. 4, 2016.
Philippine Office Action in counterpart Philippine Application No. 1/2014/501734, dated Aug. 2, 2016.

* cited by examiner

*Primary Examiner* — Lien T Tran
(74) *Attorney, Agent, or Firm* — Greenblum & Bernstein, P.L.C.

(57) ABSTRACT

An object of the present invention is to provide a method for drying non-fried noodles for obtaining non-fried noodles that are easily loosened without sticking of noodle strings and excellent in restorability. The present invention includes, as a step of drying non-fried noodles, a step of putting gelatinized noodle strings into a retainer, the retainer having one or more small holes in a bottom surface thereof so as to give a ratio of the total area of the small holes to the area of the bottom surface of the retainer of 30% or less, or having no small hole in the bottom surface, that is, the retainer having an aperture ratio of 0 to 30%, and blowing a high-speed air flow, preferably having a wind speed of 50 m/s or higher, from above the retainer toward the noodle strings in the retainer.

10 Claims, No Drawings

METHOD AND DEVICE FOR DRYING INSTANT NOODLES

TECHNICAL FIELD

The present invention relates to a method and a device for drying instant noodles for obtaining instant noodles that are easily loosened.

BACKGROUND ART

Instant noodles can be divided into two types: fried noodles prepared by frying and drying noodles; and non-fried noodles prepared by drying noodles without frying. Non-fried noodles have noodle strings giving a denser feeling than that of fried noodles, and provide a texture closer to that of fresh noodles, but sticking of the noodle strings is liable to occur at the time of drying so that the noodle strings may become hard to loosen. There are several methods for drying non-fried noodles. The general one is a hot-air drying method in which noodles are dried for about 30 to 60 minutes by being exposed to the hot air having a wind speed of around 5 m/s or less and a temperature of around 70 to 100° C. Additional examples of the method include a low-temperature drying method in which noodles are dried for a long time at a low temperature, and a high-temperature and high-speed flash drying method in which noodle strings are exposed to a high-temperature and high-speed air flow at around 100° C. to 200° C. as disclosed in Patent Document 1.

Typically, in the case of fried noodles, the noodles acquire a fixed shape while floating in frying oil with moisture evaporation, and therefore a mass of the noodles is relatively bulky and the sticking of the noodle strings is relatively less likely to occur. In the case of non-fried noodles, however, since gelatinized noodles are put into a retainer and dried in the air, the noodle strings are compressed downward by the force of gravity so that the noodle strings are easily in contact with each other, and particularly in the lower surface of the noodle mass, the noodle strings collect in a high concentration, resulting in easy sticking thereof. When the sticking of noodle strings occurs, the noodle strings are hard to loosen at the time of cooking or eating, and hot water is less likely to penetrate in the stuck noodle strings at the time of cooking. The part in which hot water does not sufficiently penetrate fails to be rehydrated, and thus is deteriorated in texture.

As a technique for preventing the sticking of noodle strings, for example, there is known a method in which noodle strings are loosened by blowing air onto a noodle mass in a retainer as disclosed in Patent Documents 2 and 3. However, the loosening devices disclosed in Patent Documents 2 and 3 are intended to improve the loosening of noodle strings in such a manner that the noodle strings put in the retainer are separated so as not to form a mountain-like mass in the retainer, failing to provide a sufficient loosening effect. Particularly, in these devices, the noodle strings are pushed toward the bottom of the retainer, especially toward a corner portion (peripheral portion) of the bottom of the retainer, so that sticking of noodle strings in such a position may occur.

On the other hand, for the purpose of reducing the sticking of noodle strings and improving the loosening thereof, there is an option of preparing a bulky-shaped noodle mass to reduce the contact area among the noodle strings as much as possible. Such a technique for drying noodles while preventing the sticking of noodle strings by preparing a bulky noodle mass is disclosed in Patent Documents 4 and 5.

The invention in Patent Document 4 defines the density of a mass of non-fried noodles that are easily loosened with good rehydration (restorability). The document discloses, as a method for preparing the noodle mass with a low noodle mass density, a method in which wind having a low temperature (30° C.) is blown upward from below the noodle mass at a wind speed of 5 m/s.

Patent Document 5 describes that instant noodles which are easily loosened with good restorability are provided by a technique of adjusting the water content of steamed noodles in the retainer to a predetermined level and then drying the noodles by the compressed air blown from below the retainer to prepare a bulky noodle mass. Patent Document 6 includes no direct description about sticking of noodle strings, but describes a technique of blowing the dry air from below a retainer having multiple air holes in its bottom surface to generate an air flow along the inner wall and bottom surface of the retainer so as to give buoyancy to noodle strings, and thereby drying them while preventing the noodle mass from adhering on the retainer.

All the techniques in Patent Documents 4, 5 and 6 are, however, those of blowing the air upward from below a retainer, in which the air blown from below first collides against the bottom surface of the retainer so that the force of the air is weakened, and accordingly the drying efficiency is reduced and the effect of improving the loosening of noodle strings may not be sufficiently attained.

PRIOR ART DOCUMENTS

Patent Documents

Patent Document 1: JP-A-09-051773
Patent Document 2: JP-Y-07-053508
Patent Document 3: JP-U-2515849
Patent Document 4: JP-A-2003-153661
Patent Document 5: JP-A-03-251148
Patent Document 6: JP-A-2005-160401

SUMMARY OF THE INVENTION

Problems to be Solved by the Invention

An object of the present invention is to provide non-fried noodles that are easily loosened without sticking of noodle strings and excellent in restorability, and another object is to dry the noodle strings as uniformly as possible.

Means for Solving the Problems

As a result of investigations by the present inventors, it has been found that, as a method for drying non-fried noodles, by replacing a conventional retainer having general air permeability (the retainer with a ratio of the total area of small holes to the bottom area=aperture ratio of 50 to 80%) with a retainer having no hole, or having one or more holes with the decreased total area thereof in the bottom surface, putting gelatinized noodle strings into the retainer, and strongly injecting a high-speed air flow downward from above, the noodle strings exhibit a state of adequately leaping in the retainer, and are dried in such a state to obtain a mass of non-fried noodles which is bulky and easily loosened without sticking of noodle strings. The present invention has been thus accomplished.

That is, the present invention is a method for drying instant noodles including a step of putting gelatinized noodle strings into a retainer for drying instant noodles, the retainer having one or more small holes in a bottom surface thereof so as to give a ratio of the total area of the small holes to the area of the bottom surface of the retainer of 30% or less, or having no small hole in the bottom surface (that is, the retainer with an aperture ratio of 0 to 30%), and blowing a high-speed air flow from above the retainer.

As described above, when the aperture ratio of the bottom surface of the retainer (the ratio of the total area of small holes in the bottom surface to the total area of the bottom surface) is within the range of 0 to 30% (inclusive), the high-speed air flow blown from above the retainer does not all leak through the small hole in the bottom surface, but a part or all of the air flow shows a reflecting behavior, and thus the noodles strings can be dried while loosened in a state of leaping or being lifted and agitated on the retainer, resulting in a noodle mass which is bulky and easily loosened without sticking of noodle strings.

Especially, the aperture ratio is preferably within the range of 10% to 30% (both inclusive), because when the ratio is within this range, a part of air flow leaks through the small hole and the noodles may be exposed to strong wind to be dried efficiently, and further, conditions may be adjusted so that the noodle strings are prevented from jumping out of the retainer due to rolled up wind. Additionally, for achieving such a behavior of the noodle mass of being lifted and agitated, the air flow blown downward from above the retainer preferably has a wind speed of 50 m/s or higher in terms of the speed to which the noodle strings in the retainer are exposed. Blowing the high-speed air flow from above toward the retainer having a low aperture ratio in the bottom surface (30% or less) generates a complicated air flow in the retainer to allow the noodle strings to be lifted and agitated, which is more effective than the manner of blowing the air upward from below to generate a laminar air flow allowing the noodle strings to be lifted as disclosed in Patent Documents 4 to 6.

In the present invention, the high-speed air flow is a hot air flow having a temperature of 100° C. to 150° C. in terms of the temperature to which the noodle strings are exposed. This makes it possible to dry the surface of the noodle strings in a short time to quickly eliminate the stickiness of the noodle strings generated by gelatinization, providing the noodles having a cooked feeling and a good texture.

In the present invention, the effects of preventing the sticking of noodle strings and improving the loosening thereof are substantially achieved at the point of time when the stickiness of the surface of the noodle strings is eliminated. Additionally, at the point of time when the water content of the noodle mass is reduced to about 30% or less by further drying, the bulk of the noodle mass is mostly determined. Therefore, it is possible that the drying method as described above is employed until either of the above points of time, after which the wind speed or the temperature may be decreased, or a different drying method may be employed, examples thereof including a common hot-air drying method and a drying method in which a high-temperature air flow is blown not only from above but also from below the noodle mass.

The device used in the present invention is a device which may be used for producing the non-fried noodles that are easily loosened as described above, particularly, a device for drying instant noodles in which a retainer is conveyed inside the device and a high-speed air flow is blown from above toward the retainer being conveyed so that gelatinized noodle strings in the retainer are dried, wherein the retainer has one or more small holes in a bottom surface thereof so as to give a ratio of the total area of the small holes to the area of the bottom surface of the retainer of 30% or less, or has no small hole in the bottom surface of the retainer.

In the device of the present invention, the air flow blown from above preferably has a wind speed of 50 m/s or higher in terms of the speed to which the noodle strings are exposed.

Effects of the Invention

According to the method and the device for drying instant noodles of the present invention, the noodle strings may be dried while being loosened so as to be formed in a bulky shape, and thus there are provided instant noodles that are easily loosened without sticking of noodle strings, and excellent in restorability.

MODE FOR CARRYING OUT THE INVENTION

Hereinafter, the present invention will be described in detail according to production steps.

In the present invention, from kneading of ingredients to gelatinization of noodle strings, a usual method for producing non-fried noodles may be applied.

Specifically, a mixture of wheat flour and optionally starch, buckwheat flour and other cereal flours is used as a main ingredient powder, thereto are optionally added auxiliary ingredients such as salt, brine, polyphosphate, egg white, gluten, an emulsifier, and fat and oil, and the ingredients are sufficiently kneaded together with kneading water. The auxiliary ingredients may be added to the main ingredient in the form of a powder, or in the form of a mixture with the kneading water. After sufficient kneading to produce a noodle dough, the noodle dough is shaped into a dough sheet by using a composite dough sheet machine or the like, and the dough sheet is passed through rolling rollers several times to be rolled out into a thin sheet with a final dough sheet thickness, and then cut out by a cutter blade roll into noodle strings. Incidentally, in mechanical noodle production, generally the noodle dough is cut out into noodle strings as described above, although it may be extruded by an extruder into noodle strings as is the case with spaghetti.

The raw noodle strings produced as above are gelatinized by steaming or boiling, or by combining both. The gelatinized noodle strings are optionally subjected to spraying with or immersion in a liquid seasoning containing salt or a flavoring and salt, the resultant noodle strings are cut into one meal portion, and the one meal portion is then put into a retainer and dried.

The retainer used in the present invention is a substantially cup-shaped or substantially deep dish-shaped retainer for drying instant noodles, with the bottom surface being substantially horizontal and the side surface rising from the bottom surface. The side surface of the retainer preferably has an even and flat face without air permeability. The bottom surface of the retainer may be formed to have no hole, that is, no air permeability, but is preferably formed to have multiple small holes. In this case, each small hole has such a size that a noodle string in the retainer is prevented from falling through the hole, and desirably has a diameter of about 0.5 to 6 mm. Preferably the holes are formed to be substantially uniformly distributed in the bottom surface. In the present invention, the ratio of the total area of the multiple small holes formed in the bottom surface to the area of the bottom surface of the retainer (aperture ratio) is within the range of 30% or less. If the aperture ratio is 30% or more, the air flow blown from above the retainer easily leaks through the small holes, and the noodles are likely to be pushed toward the bottom surface of the retainer; whereas if the ratio is 10% or less, the drying efficiency is decreased. Therefore, a particularly preferable aperture ratio is 10% to 30%.

Additionally, for a more preferable shape of the retainer of the present invention, the bottom surface of the retainer may be flat, and a transition portion from the bottom surface to the side surface (side wall) may be formed in a curved shape without any angular corner or spot into which the noodle strings are pushed and collected due to the blown air flow. However, if the curved portion has too large a radius of curvature, the noodle strings may be collected in the central part of the bottom surface, and the noodle density may be increased in the central part. Therefore, the round transition portion from the bottom surface to the side surface preferably has a radius of curvature of about 5 mm to 15 mm. As used herein, the bottom surface of the retainer refers to an area defined by the tangent line at the round transition portion making an angle of 45° or less with the bottom surface of the retainer.

In the present invention, most preferably the side surface (side wall) of the retainer has a round shape without any corner portion in top view so that the noodle strings are not pushed thereto, and also preferred is the rectangular shape with round corner portions. Further, if the retainer has a mortar-shaped side surface (side wall) with a wide opening, the noodle strings in the retainer easily jump out from the opening. Therefore, it is preferred that the side surface of the retainer is perpendicular to the bottom surface, or has a taper angle of up to about 20°. For the size of the retainer for one meal portion, as a specific example, the retainer may have a volume of about 400 to 500 cc, while the retainer may have a greater depth or volume so as to keep the noodles from easily jumping out.

Into the retainer as described above, the gelatinized noodles are put, and the high-speed air flow is then injected from above the retainer downward to the noodle strings in the retainer. The high-speed air flow is preferably blown toward the retainer vertically at a wind speed of 50 m/s or higher, especially preferably 60 to 80 m/s as measured at around the upper surface of the noodle mass placed in the retainer. The air flow at such a speed may be blown either continuously or intermittently.

As described above, when the air flow is strongly blown to the retainer having a ratio of the total area of the small holes (air holes) formed in the retainer to the area of the bottom surface of the retainer of, for example, 30% (aperture ratio of 30%) or less, a part of the blown air is reflected and rises so that the noodle strings show a leaping-like behavior in the retainer. Particularly preferably, the air flow is blown so that the noodle strings may be lifted and agitated in the retainer. When the noodle strings are lifted and agitated, and dried while loosened as above, not only sticking of the noodle strings is avoided, but also the noodle mass has a smaller variety of the density and is therefore more uniformly dried, as compared to the case of using a retainer having an aperture ratio of about 50 to 80%, a common retainer for non-fried instant noodles.

In the present invention, the device may be of any type as far as the device is capable of providing a strong air flow having a high speed as described above, and one example thereof is a system in which the air flow sent from a powerful fan is narrowed at an injection part to give an increased wind speed for injection. For example, the device may have a tubular injection nozzle or a slit-like injection nozzle as an injection part, and the nozzle is preferably disposed above the retainer and allowed to vigorously inject the hot air. When the strong air flow is blown in a spot injection manner as described above, the noodle strings are more surely agitated, and likely to exhibit their leaping-like behavior.

Specifically, in a high-temperature flash drying device used for, for example, puffing drying a snack food, or firing or roasting various processed foods as described in JP-A-09-47224 and JP-A-2003-90680, a retainer slowly conveyed under a nozzle therein desirably has the shape of the retainer according to the present invention as mentioned above. Incidentally, in the device of the present invention, the high-speed air flow is required to be blown from above toward the retainer having the shape as mentioned above, while there may also be used a device, for example, in which injection nozzles are disposed above and below the retainer as disclosed in JP-A-09-210554 as far as the device provides the above drying method according to the present invention.

The present invention is mainly intended to improve the loosening of noodle strings, and if just for reduction in stickiness of the surface of the noodle strings, the temperature of the blown air flow may be a normal temperature. However, when the air flow has a higher temperature, the noodle strings are quickly dried and give a preferable texture with a cooked feeling. In order to obtain such effects, a particularly preferable temperature is about 100° C. to 150° C.

Further, when the surface of the noodle strings is dried, it becomes non-sticky, that is, the sticking of noodle strings is substantially reduced, and thus the loosening of noodle strings is substantially improved at this stage. Therefore, the above drying method may be performed for a short time until the noodle strings are dried to the extent that the surface thereof becomes non-sticky, and then the noodle strings may be anew dried by a different drying method.

In order to obtain a bulky noodle mass which is further easily loosened and uniformly restored, the noodle strings may be dried until the shape of the noodle mass is nearly fixed, or approximately until the water content of the noodle strings is reduced to about 30% or less; thus, the noodle strings may be dried with the high-speed air flow as described above until the water content of the noodle strings is reduced to about 30%, after which the noodle strings may be dried by a different drying method. In the different drying method as described above, specifically and in any case, conditions including the temperature and the wind speed may be changed, or alternatively the typical hot-air drying conditions for drying non-fried noodles, or other drying methods may be employed for the finish drying.

The instant noodles (non-fried noodles) dried in this manner are put into a cup container made of a synthetic resin or paper for producing cupped noodles, or packaged in a packaging bag for producing bagged noodles. Such instant noodles have the reduced sticking of noodle strings, and therefore at the time of rehydration, cooking or eating, the noodles are easily loosened and give a good texture.

EXAMPLES

Experiment 1: Test for Aperture Ratio

As a main ingredient, 150 g of starch was added to 850 g of wheat flour. Then, 20 g of salt, 3 g of brine, and 1 g of polyphosphate were dissolved in 400 ml of water and the solution was added to the main ingredient. The ingredients were sufficiently kneaded by a mixer, and formed into a dough sheet with a thickness of 12 mm by a composite dough sheet machine. The dough sheet was passed through continuous rolling rollers to give a final dough sheet thickness of 1.8 mm. The dough sheet was cut out by a cutter blade roll with a square cutter (No. 16) into strings, thereby obtaining raw noodle strings.

The cut out raw noodle strings were conveyed on a net conveyor, steamed with saturated steam at a rate of 240 kg/h, at about 100° C. for 2 minutes, and subsequently boiled with boiling water for 10 seconds. The resulting gelatinized noodle strings were immersed in a liquid seasoning containing 5% of salt and a small amount of a flavoring dissolved therein for several seconds, after which the noodle strings were cut into one meal portion (180 g), and the one meal portion was put into a retainer.

Example 1

A retainer having the following specifications was used: a volume of about 450 cc, an opening diameter of the retainer (diameter of the upper side of the retainer) of 137 mm, a height of 40 mm, and a taper angle (the angle between the plane perpendicular to the bottom surface and the side surface spreading outward) of 20°, wherein small holes formed in the bottom surface of the retainer had a diameter of 4.0 mm and were substantially uniformly distributed in the entire bottom surface, and the ratio of the total area of the small holes to the area of the bottom surface of the retainer was 20% (Example 1), or 58% (as in a conventional common retainer; Comparative Example 1) (%: aperture ratio). The retainer as described above was allowed to travel horizontally at a traveling speed of about 2.5 m/s in a drying chamber where a high-temperature and high-speed air flow was blown so that the retainer was subjected to drying. In the drying machine, about 240 narrow tubular nozzles are disposed per 1 m$^2$ of the ceiling thereof, and the high-temperature and high-speed air flow is injected from the nozzles.

The drying temperature was 140° C. as measured by a sensor placed at an outlet of the nozzle. The wind speed was adjusted to 70 m/s as measured by a pitot tube disposed near the upper surface of the noodle mass, and the air flow was blown for 72 seconds.

Subsequently, for finish drying, the noodle mass was dried while kept contained in each retainer in an ordinary hot-air drying machine at an inside temperature of 90° C. and a wind speed of 4.0 m/s for 60 minutes. The noodle mass after dried had a weight of approximately 90 g.

To the instant noodle mass produced in this manner was poured 400 ml of boiling water, and the noodle mass was left for 4 minutes before eating. As a result, the noodle mass prepared by using the retainer with an aperture ratio of 20% in Example 1 according to the present invention was significantly improved in loosening of noodle strings at the time of eating, as compared to that prepared by using the conventional retainer with an aperture ratio of 58% in Comparative Example 1.

Examples 2, 3 and 4

For investigation of the relationship between the aperture ratio of the retainer and the loosening of noodle strings, a comparative experiment was carried out using retainers having the same volume and general shape as those described above, but having different ratios of the total area of small holes to the area of the bottom surface of the retainer (aperture ratio) between 10 and 58%, and a radius of curvature R of the transition portion (corner portion) from the bottom surface to the side surface (side wall) of the retainer of 10 mm (R=10 mm).

The retainers used in this experiment were the same as that in Example 1 as described above, that is, the small holes formed in the bottom surface of the retainer had a diameter of 4.0 mm and were substantially uniformly distributed in the entire bottom surface, except that the retainers had different aperture ratios and a radius of curvature of the transition portion from the bottom surface to the side surface of the retainer of 10 mm (in Example 1 and Comparative Example 1, the retainer had the bottom surface intersecting with the side wall surface with an apex to form an internal corner portion). The retainers having ratios of the total area of small holes to the area of the bottom surface of the retainer of 10%, 20%, 30%, and 58% were used in Example 2, Example 3, Example 4, and Comparative Example 2, respectively. The drying device, the drying method and conditions were the same as in Example 1.

The results are shown in Table 1. In the results, with the retainer having an aperture ratio of 10%, the finish drying was insufficient. But in this case, for example, if the time for finish drying is extended, or a retainer having a general aperture ratio is used for finish drying, then a preferable noodle mass that has been sufficiently dried is obtained.

TABLE 1

| Aperture ratio (%) | Loosening of noodle strings at the time of eating | Evaluation for shape | Comments |
|---|---|---|---|
| 10 | 5 | 5 | Excellent in shape and loosening of noodle strings, but the finish drying performed later is not sufficient with this retainer. |
| 20 | 5 | 5 | Most preferable state. |
| 30 | 3 | 3 | Sticking of the noodle strings is slightly observed, but improved as compared to the case of an aperture ratio of 58%. |
| 58 | 2 | 2 | Noodles do not leap in the high-temperature and high-speed air flow, loosening of noodle strings is poor, and the noodle mass has a high density of noodle strings in its lower part. |

The evaluations on a 5-point scale were made by five panelists. The panelists ate the noodles after pouring 400 ml of boiling water onto the noodle mass and leaving it for 4 minutes.

The evaluation for the loosening of noodle strings at the time of eating was made based on the criteria as follows; point 5: the noodle state capable of being loosened very easily, point 4: the noodle state capable of being loosened easily with chopsticks, point 3: the noodle state capable of being loosened with chopsticks, point 2: the noodle state of being partially hard to loosen with chopsticks, and point 1: the noodle state of being hard to loosen with chopsticks due to heavy sticking of the noodle strings. The evaluation for shape was made by confirmation before the pour of boiling water, based on the criteria as follows; point 5: the preferable state of being bulky and entirely uniform, point 3: the state of being not especially high in density of noodle strings in an angular part or the like of the noodle mass, with no great problem in restorability expected, and point 1: the state of being very high in density of noodle strings in the lower part of the noodle mass, with poor rehydration expected.

Experiment 2: Test for Wind Speed>

Next, the wind speed of the air flow blown to noodles for obtaining a noodle mass that is easily loosened was changed to 30 m/s to 70 m/s for carrying out Experiment 2, with use of the retainer having an aperture ratio of 20% which was used for Example 3 in Experiment 1. Other conditions including the device used, the temperature, and the drying time were all the same as in Experiment 1. The results are shown in Table 2. In this experiment, the evaluation for shape was made by actually measuring the height of a noodle mass according to the following method.

Method for measuring height of noodle mass: measurement was made for three positions at 30 mm from the center of the noodle mass, as well as for six positions at 15 mm from the center of the noodle mass, and the average of the measurements was calculated as the height of the noodle mass.

The results from the experiment indicated that the optimal wind speed varies according to the noodle weight. In the case of the wind speed of 60 m/s, when the experiment was carried out using one meal portion of the noodle mass having a slightly lighter weight (weight of the noodles put into the retainer) of 170 g, there was provided a noodle mass that is very easily loosened (point 5).

TABLE 2

| Wind speed (m/s) | Evaluation for shape (mm) Height of noodle mass (average) | Loosening of noodle strings at the time of eating | Comments |
| --- | --- | --- | --- |
| 30 | 22.5 | 2 | Poor loosening of noodle strings with sticking. |
| 40 | 23.1 | 2 | Poor loosening of noodle strings with sticking. |
| 50 | 24.4 | 3 | Partial sticking of noodle strings is observed, but sticking is much improved compared to the case of 40 m/s. |
| 60 | 24.9 | 4 | Partial sticking of noodle strings is observed, but sticking is further improved compared to the case of 50 m/s. |
| 70 | 27.0 | 5 | Excellent loosening of noodle strings without sticking. |

Experiment 3: Test for Temperature

The wind speed was set to 70 m/s and the temperature of the blown air flow was changed to 60° C. to 160° C. for carrying out Experiment 3, with use of the retainer having an aperture ratio of 20% which was used for Example 3 in Experiment 1. Other conditions including the device used, the wind speed, the drying time, and the finish drying were all the same as in Example 3. The results are shown in Table 3.

TABLE 3

| Temperature (° C.) | Evaluation for shape (mm) Height of noodle mass (average) | Loosening of noodle strings at the time of eating | Comments |
| --- | --- | --- | --- |
| 60 | 27.0 | 4 | Rawish taste, somewhat lacking in cooked feeling |
| 80 | 27.6 | 4 | Rawish taste, somewhat lacking in cooked feeling |
| 100 | 27.4 | 5 | Cooked feeling in texture |
| 120 | 27.5 | 5 | Cooked feeling in texture |
| 140 | 27.2 | 5 | Cooked feeling in texture |
| 160 | 27.1 | 4 | Good texture, with slight sticking of the noodle strings |

Example 5

In accordance with the same formulation and method as those for Example 3 in Experiment 1 as described above, raw noodle strings were prepared and then similarly gelatinized so that gelatinized noodle strings were prepared. The gelatinized noodle strings were immersed in a liquid seasoning containing 5% of salt and a small amount of a flavoring dissolved therein for several seconds, and the noodle strings were cut. About 180 g of the cut noodle strings were put into a retainer similar to that in Example 3, having an aperture ratio of 20%, a radius of curvature R of the transition portion from the bottom surface to the side surface of the retainer of 10 mm, and a volume of 450 cc. Then, in the same drying device as in Example 3, the high-temperature and high-speed air flow was injected from the nozzle above the retainer and blown to the noodle mass in the retainer at a wind speed of up to 70 m/s as measured by a pitot tube disposed near the upper surface of the noodle mass.

It should be noted that in Example 5 drying was performed by not utilizing the combination of the drying with the high-temperature and high-speed air flow and the general drying with the hot-air as in Example 3, but only by the drying with the high-temperature and high-speed air flow. Specifically, drying was performed at 155° C. for initial 60 seconds, then at 130° C. for subsequent 60 seconds, and at 110° C. for further 13 minutes, as measured by a thermometer disposed near the outlet of the nozzle. Also by the method in Example 5, there were provided noodles that are increased in bulkiness, much more easily loosened and improved in texture as compared to those in Comparative Example 2.

Example 6

In accordance with the same formulation and method as those for Example 3 in Experiment 1 as described above, raw noodle strings were prepared and then similarly gelatinized so that gelatinized noodle strings were prepared. The gelatinized noodle strings were immersed in a liquid seasoning containing 5% of salt and a small amount of a flavoring dissolved therein for several seconds, and the noodle strings were cut. About 180 g of the cut noodle strings were put into a retainer almost similar to that in Example 3 in outer shape, having a volume of about 450 cc and a radius of curvature R of the transition portion from the bottom surface to the side surface of the retainer of 10 mm, but no small hole in the bottom surface, that is, an aperture ratio of 0%. Then, in the same drying device as in Example 3, the high-temperature and high-speed air flow of 140° C. was injected from the nozzle above the retainer and blown to the noodle mass in the retainer for 72 seconds at a wind speed of up to 50 m/s as measured by a pitot tube disposed near the upper surface of the noodle mass.

Since it takes a long time to perform drying with the retainer having no small hole in the bottom surface, that is, a retainer having an aperture ratio of 0%, the noodle mass was transferred to a retainer having an aperture ratio of 20% as in Example 3 immediately after the 72-second treatment. Subsequently, for finish drying, the noodle mass was dried in an ordinary hot-air drying machine at an inside temperature of 90° C. and a wind speed of 4.0 m/s for 60 minutes in the same manner as the finish drying in Example 3. The noodle mass after dried had a weight of approximately 90 g. Also by the method in Example 6, there were provided noodles that are more easily loosened and improved in texture as compared to those in Comparative Example 2.

The invention claimed is:

1. A method for drying instant noodles, comprising:
    putting gelatinized noodle strings into a retainer for drying instant noodles, the retainer having one or more small holes in a bottom surface thereof so as to give a ratio of a total area of the small holes to an area of the bottom surface of the retainer of 30% or less, or having no small hole in the bottom surface,
    blowing a high-speed air flow from above the retainer, and lifting the noodle strings from contact with the retainer by the high-speed air flow blown from above the retainer,
    wherein the high-speed air flow has a wind speed of 50 m/s or higher in terms of the speed to which the noodle strings in the retainer are exposed, and the noodle strings are dried with the high-speed air flow until the water content of the noodle strings is reduced to 30% or less.

2. The method for drying instant noodles according to claim 1, wherein the drying is performed while the noodle strings are lifted and agitated to be loosened in the retainer by the high-speed air flow.

3. The method for drying instant noodles according to claim 1, wherein the high-speed air flow is a hot air flow having a high temperature of 100° C. to 150° C. in terms of the temperature to which the noodle strings are exposed.

4. The method for drying instant noodles according to claim 1, further comprising drying the noodle strings by a different drying method after the blowing the high-speed air flow.

5. The method for drying instant noodles according to claim 1, further comprising reflecting at least a portion of the high-speed air flow off of the retainer, wherein the reflected portion of the high-speed air flow lifts the noodle strings from contact with the retainer.

6. A method for drying instant noodles, comprising:
    putting gelatinized noodle strings into a retainer for drying instant noodles, the retainer having one or more small holes in a bottom surface thereof so as to give a ratio of a total area of the small holes to an area of the bottom surface of the retainer of 30% or less, or having no small hole in the bottom surface,
    blowing a high-speed air flow from above the retainer, and lifting the noodle strings from contact with the retainer by the high-speed air flow blown from above the retainer,
    wherein the high-speed air flow has a wind speed of 50 m/s or higher in terms of the speed to which the noodle strings in the retainer are exposed, and the noodle strings are dried with the high-speed air flow until the water content of the noodle strings is reduced to about 30%.

7. The method for drying instant noodles according to claim 6, wherein the drying is performed while the noodle strings are lifted and agitated to be loosened in the retainer by the high-speed air flow.

8. The method for drying instant noodles according to claim 6, wherein the high-speed air flow is a hot air flow having a high temperature of 100° C. to 150° C. in terms of the temperature to which the noodle strings are exposed.

9. The method for drying instant noodles according to claim 6, further comprising drying the noodle strings by a different drying method after the blowing the high-speed air flow.

10. The method for drying instant noodles according to claim 6, further comprising reflecting at least a portion of the high-speed air flow off of the retainer, wherein the reflected portion of the high-speed air flow lifts the noodle strings from contact with the retainer.

* * * * *